US012654873B2

(12) United States Patent
Voutilainen et al.

(10) Patent No.: US 12,654,873 B2
(45) Date of Patent: Jun. 16, 2026

(54) METHOD TO ADDRESS ENGINE FAILURE DURING TAKEOFF

(71) Applicant: Rockwell Collins, Inc., Cedar Rapids, IA (US)

(72) Inventors: Niko Voutilainen, Cedar Rapids, IA (US); David Watkins, Syracuse, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 88 days.

(21) Appl. No.: 18/732,249

(22) Filed: Jun. 3, 2024

(65) Prior Publication Data

US 2025/0368351 A1 Dec. 4, 2025

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
CPC .................................................... B64D 45/00
See application file for complete search history.

(56) References Cited

U.S. PATENT DOCUMENTS

| | | | |
|---|---|---|---|
| 7,499,771 B2 | 3/2009 | Caillaud | |
| 7,640,082 B2 | 12/2009 | Dwyer | |
| 7,876,238 B2 | 1/2011 | Vandenbergh et al. | |
| 7,996,121 B2 | 8/2011 | Ferro et al. | |
| 8,121,783 B2 | 2/2012 | Bitar et al. | |
| 8,521,340 B2 * | 8/2013 | Coulmeau | G08G 5/58 |
| | | | 701/16 |
| 9,260,197 B2 | 2/2016 | Thompson et al. | |
| 9,583,010 B1 | 2/2017 | Kolek et al. | |
| 9,697,737 B2 * | 7/2017 | Hale | G08G 5/34 |
| 10,026,327 B2 | 7/2018 | Prenot et al. | |
| 10,247,574 B2 | 4/2019 | Singh et al. | |
| 11,270,593 B2 | 3/2022 | Molnar et al. | |
| 11,532,235 B2 * | 12/2022 | Holder | B64D 45/00 |
| 11,599,126 B2 | 3/2023 | Ceparu et al. | |
| 11,745,896 B2 | 9/2023 | Mast et al. | |
| 11,822,352 B2 | 11/2023 | Singh et al. | |
| 11,851,166 B2 | 12/2023 | Mcdonough et al. | |

(Continued)

OTHER PUBLICATIONS

Website Screenshot <https://foreflight.com/products/dispatch/>, "ETP & ETOPS Planning", 7 pages, retrieved Oct. 29, 2024.

(Continued)

*Primary Examiner* — Michael A Berns
(74) *Attorney, Agent, or Firm* — Kinney & Lange, P.A.

(57) ABSTRACT

A system for displaying an engine out flight plan via an aircraft display device includes a processor and computer-readable memory operably connected to the processor. The computer-readable memory is encoded with instructions that, when executed by the processor, cause the system to perform the following step: receive an engine out procedure, generate the engine out flight plan based upon the engine out procedure, display the engine out flight plan via the aircraft display device, receive an indication of an engine anomaly, and update a guidance aid overlay on the aircraft display device to display a flight attitude based upon the engine out flight plan in response to the indication of the engine anomaly via the aircraft display device.

16 Claims, 4 Drawing Sheets

(56) References Cited

U.S. PATENT DOCUMENTS

| | | | |
|---|---|---|---|
| 11,935,420 | B1 | 3/2024 | Suiter et al. |
| 2008/0071434 | A1 | 3/2008 | Fortier et al. |
| 2022/0292990 | A1 | 9/2022 | Martinez et al. |
| 2023/0072633 | A1 | 3/2023 | Kanagarajan et al. |
| 2025/0299584 | A1* | 9/2025 | Voutilainen .............. G08G 5/76 |
| 2025/0368351 | A1* | 12/2025 | Voutilainen ............ B64D 45/00 |

OTHER PUBLICATIONS

Website Screenshot from <https://www.foreflight.com/products/runway-analysis-business/>, "3D Engine Out Procedures", 7 pages, retrieved Oct. 29, 2024.
Website screenshot from <https://www.foreflight.com/releases/13-5/ >, "Runway Analysis: EOP Visualization", 2 pages, retrieved Oct. 29, 2024.

\* cited by examiner

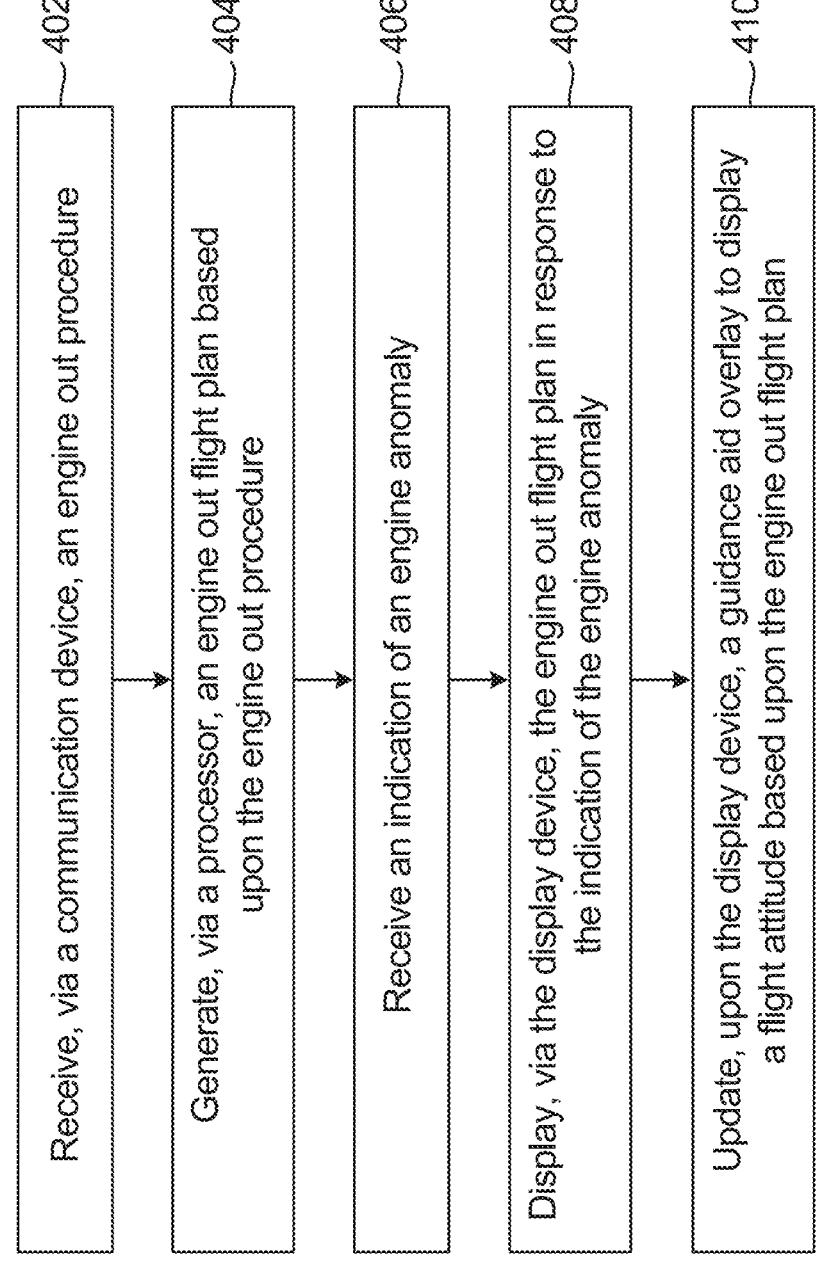

400

402

Receive, via a communication device, an engine out procedure

404

Generate, via a processor, an engine out flight plan based upon the engine out procedure

406

Receive an indication of an engine anomaly

408

Display, via the display device, the engine out flight plan in response to the indication of the engine anomaly

410

Update, upon the display device, a guidance aid overlay to display a flight attitude based upon the engine out flight plan

Fig. 4

METHOD TO ADDRESS ENGINE FAILURE DURING TAKEOFF

BACKGROUND

During aircraft departure, an engine out procedure specific to the given aircraft is provided to the aircraft crew. The engine out procedure details the steps to be followed in response to an aircraft losing an engine after exceeding V1 speed on takeoff, wherein V1 speed is the maximum speed at which the pilot can stop the aircraft safely on the runway. The engine out procedure provides directions to a path that avoids obstacles for safe landing of the aircraft. Current processes involve the aircraft crew using an engine out procedure to manually place a waypoint on a map and directing the aircraft towards the waypoint. Alternatively, current processes involve committing the engine out procedure to memory and relying on such memory while directing the aircraft towards the waypoint. Current processes create a large margin for error as the aircraft pilot must manually input the waypoint and thereafter correct the course of the aircraft in a high-pressure emergency condition, which can, in some cases, lead to safety critical errors. Thus, an improved method for displaying an engine out procedure is desirable.

SUMMARY

A system for displaying an engine out flight plan via an aircraft display device includes a processor and computer-readable memory operably connected to the processor. The computer-readable memory is encoded with instructions that, when executed by the processor, cause the system to perform the following steps. The system receives an engine out procedure. The system generates the engine out flight plan based upon the engine out procedure. The system displays the engine out flight plan via the aircraft display device. The system receives an indication of an engine anomaly. The system updates a guidance aid overlay on the aircraft display device to display a flight attitude based upon the engine out flight plan in response to the indication of the engine anomaly via the aircraft display device.

A method for displaying an engine out flight plan via an aircraft display device includes receiving an engine out procedure. The method further includes generating, via a processor, an engine out flight plan based upon the engine out procedure. The method further includes receiving an indication of an engine anomaly. The method further includes displaying, via an aircraft display device, the engine out flight plan in response to the indication of the engine anomaly. The method further includes updating a guidance aid overlay on the aircraft display device to display a flight attitude based upon the engine out flight plan.

BRIEF DESCRIPTION OF THE DRAWINGS

FIG. 4 is a method for displaying the engine out flight plan via the aircraft display device.

DETAILED DESCRIPTION

The techniques of this disclosure relate to a method of displaying an engine out procedure (also referred to as an Engine Out Standard Instrument Departure (EOSID)) on a display device, such as an aircraft display device contained within a cockpit of an aircraft. The engine out procedure can be displayed as a flight plan. An engine out procedure is implemented in cases where an aircraft engine is inoperable due to, for example, an engine failure, engine fire, or other anomaly resulting in an engine shut down. In operation, a system for displaying the engine out flight plan receives an engine out procedure detailing the steps to be taken in the case of an engine out condition. The system generates an engine out flight plan based upon the engine out procedure. The system receives an indication of engine failure from an engine failure detection system within the aircraft, via a manual input from an aircraft operator, and/or via an inference of engine failure based on the course of the aircraft. The system loads the engine out flight plan from memory and displays the engine out flight plan via the aircraft display device as an active flight plan. The system updates the flight indicator, which can also be displayed on the aircraft display device, such that the flight indicator displays an attitude consistent with the engine out flight plan.

Figure 1:
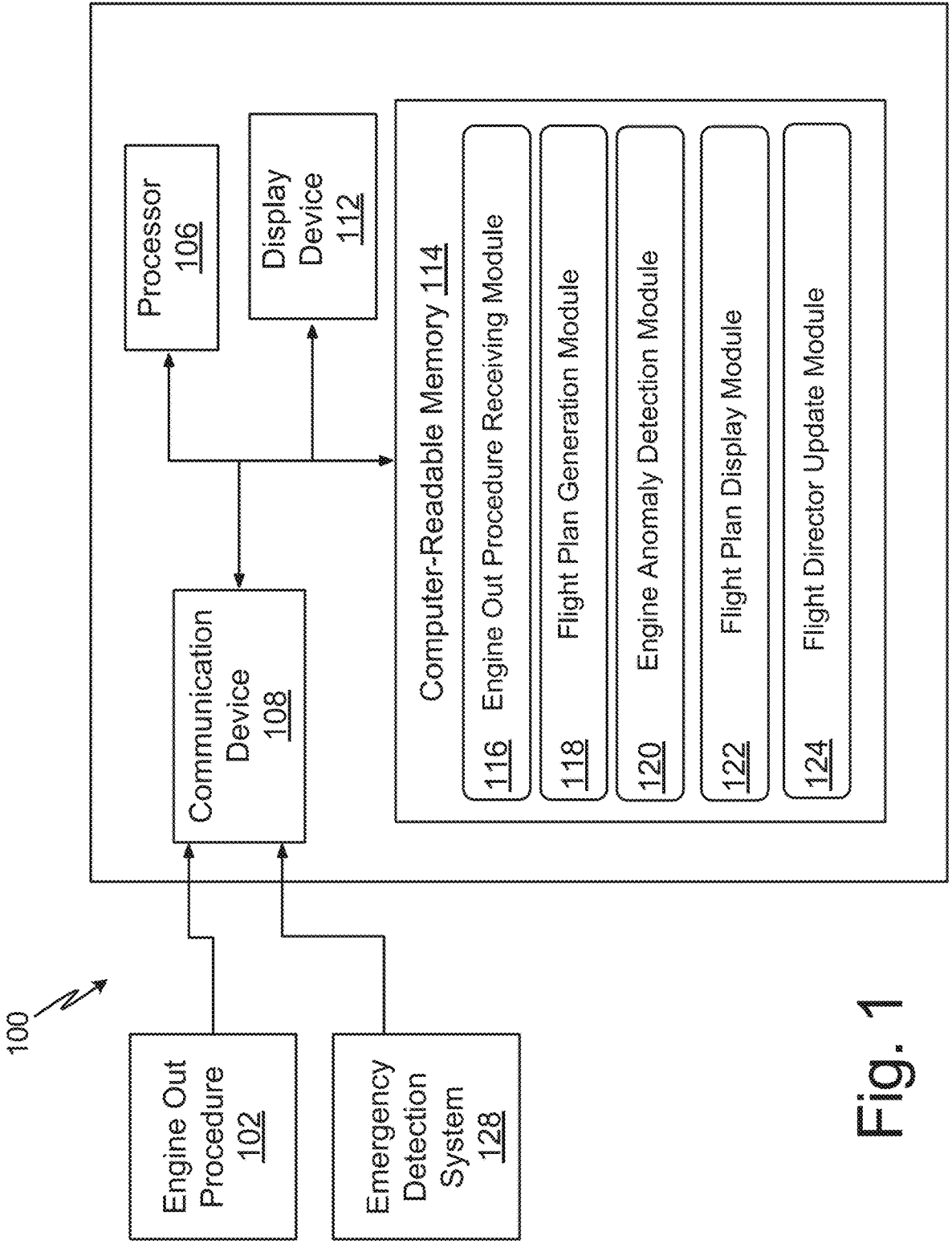
FIG. 1 is a diagram of a system displaying an engine out flight plan via an aircraft display device.

FIG. 1 is a diagram of system 100 for displaying an engine out procedure via an aircraft display device. System 100 includes processor 106, communication device 108, display device 112, and computer-readable memory 114. Computer-readable memory 114 includes engine out procedure receiving module 116, flight plan generation module 118, engine anomaly detection module 120, flight plan display module 122, and flight director update module 124.

Processor 106, in some examples, is configured to implement functionality and/or process instructions for execution within system 100. For instance, processor 106 can be capable of processing instructions stored in computer-readable memory 114. Examples of processor 106 can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory 114, in some examples, is described as computer-readable storage media. In some examples, a computer-readable storage medium includes a non-transitory medium. The term "non-transitory" indicates that the storage medium is not embodied in a carrier wave or a propagated signal. In certain examples, a non-transitory storage medium stores data that, over time, changes (e.g., in RAM or cache). In some examples, computer-readable memory 114 is a temporary memory, meaning that a primary purpose of computer-readable memory 114 is not long-term storage. Computer-readable memory 114, in some examples, is described as volatile memory, meaning that computer-readable memory 114 does not maintain stored contents when electrical power to computer-readable memory 114 is removed. Examples of volatile memories can include random access memories (RAM), dynamic random access memories (DRAM), static random access memories (SRAM), and other forms of volatile memories. In some examples, computer-readable memory 114 is used to store program instructions for execution by processor 106. Computer-readable memory 114, in one example, is used by software or applications to temporarily store information during program execution. Computer-readable memory 114, in some examples, also includes one or more computer-readable storage media. Computer-readable memory 114 is configured to store larger amounts of information than volatile memory. Computer-readable memory 114 is further configured for long-term storage of information. In some examples, computer-readable memory 114 includes non-volatile storage elements. Examples of such non-volatile storage elements include, but are not limited to, magnetic hard discs, optical discs, flash memories, or forms of electrically programmable memories (EPROM) or electrically erasable and programmable (EEPROM) memories.

Display device 112 is an input and/or output device that enables a user to view the output of system 100. Display device 112 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users, machines, or other computing devices.

Engine out procedure 102 is connected to system 100 via an operable connection between engine out procedure 102 and communication device 108. In one embodiment, engine out procedure 102 is a textual description of the engine out flight plan. In another embodiment, engine out procedure 102 is a graphical representation of the engine out flight plan. Emergency detection system 128 is connected to system 100 via an operable connection between emergency detection system 128 and communication device 108. In one embodiment, emergency detection system 128 is an aircraft emergency detection system which transmits an indication of an engine anomaly to system 100 based upon a detected engine issue. Processor 106, communication device 108, and display device 112 are interconnected within system 100.

In operation, computer-readable memory 114 is encoded with instructions that are executed by processor 106. Computer-readable memory 114 includes engine out procedure receiving module 116. Engine out procedure receiving module 116 includes one or more programs containing instructions to receive engine out procedure 102. Upon execution of engine out procedure receiving module 116, engine out procedure 102 is received by system 100 via communication device 108. As described, engine out procedure 102 can be a textual description of an engine out flight plan and/or a graphical representation of the engine out flight plan.

In some embodiments, upon execution of engine out procedure receiving module 116, a graphical user interface is displayed via display device 112 allowing a user to manually input engine out procedure 102. In such an embodiment, the user can enter a textual description of the engine out flight plan to be received by system 100.

Computer-readable memory 114 further includes flight plan generation module 118. Flight plan generation module 118 includes one or more programs containing instructions to generate an engine out flight plan based upon engine out procedure 102. Upon execution of flight plan generation module 118, processor 106 generates the engine out flight plan based upon engine out procedure 102 by converting engine out procedure 102 into a flight plan format suitable for display via display device 112.

In an embodiment wherein engine out procedure 102 is a textual description of the engine out flight plan, processor 106 can parse the textual description and convert such a textual description into the flight plan format suitable for display via display device 112. In one example, the textual description of the engine out flight plan can include a listing such as "HDG: RH093, ALT: 2256, TURN: 090". Processor 106 can parse the example textual description and interpret it as meaning that in the event of an engine failure during takeoff, upon reaching 400 feet above ground level, the aircraft should make a right hand turn (RHT) to a runway heading (i.e., the magnetic direction corresponding to the centerline of the runway) of 093. Upon reaching an altitude of 2256 feet acceleration altitude, the aircraft should turn to a heading of 90 degrees. Such instructions can be converted to a flight plan suitable for display via display device 112 by execution of flight plan generation module 118. In an embodiment where engine out procedure 102 is a graphical representation of the engine out flight plan, the graphical representation can be processed via processor 106 and thereafter converted into the flight plan format suitable for display via display device 112.

Computer-readable memory 114 further includes engine anomaly detection module 120. Engine anomaly detection module 120 includes one or more programs containing instructions to receive an indication of an engine anomaly. An engine anomaly can occur due to an engine failure (e.g., an engine fire), or other anomaly (e.g., a bird strike) that would result in an engine shutdown. Upon execution of engine anomaly detection module 120, system 100 can detect an engine anomaly using various methods. In one embodiment, an engine anomaly is detected via emergency detection system 128. In such an embodiment, emergency detection system 128 is a connected aircraft system for detecting anomalies within the aircraft's engine(s). Upon detection of an anomaly, emergency detection system 128 can transmit an emergency detection signal to system 100 via communication device 108.

In other embodiments, an engine anomaly is detected via a manual input. In such an embodiment, a user (e.g., a pilot, co-pilot, or other aircraft crew member) can manually indicate that an engine anomaly has occurred. In such an embodiment, the indication of the engine anomaly can be input via a user interface within display device 112. In one example, a dialog box is displayed via display device 112 wherein the user can interact with the dialog box (e.g., a button press) to indicate the engine anomaly is occurring.

In still other embodiments, system 100 can automatically infer an engine anomaly has occurred based upon the course of the aircraft. In such an embodiment, system 100 can detect whether the aircraft is following the engine out flight plan. Such a scenario can occur when the aircraft operator realizes an engine anomaly has occurred and manually alters the course of the aircraft to follow the engine out flight plan. Upon detecting that the aircraft is following the engine out flight plan for a predetermined period of time (e.g., 10 seconds), system 100 can thereafter automatically indicate that an engine anomaly is occurring. Additionally or alternatively, system 100 can first detect whether the aircraft flight path is off course from a primary flight path, detect whether the aircraft flight path is substantially following the engine out flight plan, and thereafter indicate an engine anomaly in response to the direction of the aircraft flight path substantially following the engine flight plan.

Computer-readable memory 114 further includes flight plan display module 122. Flight plan display module 122 includes one or more programs containing instructions to display the engine out flight plan generated by the execution of flight plan generation module 118 in response to an engine anomaly detected by execution of engine anomaly detection module 120. Upon execution of flight plan display module 122, display device 112 can display the engine out flight plan as the primary flight plan. In some embodiments, the engine out flight plan is previously displayed as the secondary flight plan and is then displayed as the primary flight plan upon execution of flight plan display module 122. Additional description regarding the display of the engine out flight plan is provided below in the description of FIG. 2.

Computer-readable memory 114 further includes flight director update module 124. Flight director update module 124 includes one or more programs containing instructions to update a guidance aid overlay on display device 112 to display a flight attitude based upon the engine out flight plan. Upon execution of flight director update module 124, processor 106 updates the flight director (i.e., the guidance aid that is overlaid on an attitude indicator). In some embodiments, the flight director is updated on an attitude indicator that is distinct from display device 112. In other embodiments, the attitude indicator is integrated within display device 112. Additional description regarding the updating of the flight director is provided below in the description of FIGS. 3A and 3B.

System 100 provides the advantage of providing a visual display of the engine out procedure as a flight plan for an aircraft operator to follow in response to detection of an engine anomaly. This is particularly beneficial for pilots who would otherwise be required to manually course correct to the engine out flight plan without the aid of the visualization of the flight plan. Manual course correction can occasionally result in errors impacting safety, especially if the pilot must refer to a textual description of the engine out procedure and thereafter fly an aircraft in accordance with the engine out procedure in a high-stress emergency situation. Thus, system 100 allows for the pilot to have the visual aid of the engine out flight plan, thereby vastly simplifying the engine out flying procedure and reducing the likelihood of safety critical errors. System 100 also provides for various methods of detecting an engine anomaly, including indication from a connected emergency detection system (e.g., emergency detection system 128), manual input from the aircraft operator, and/or automatic detection that the aircraft course has been altered to follow the engine out flight plan.

Figure 2:
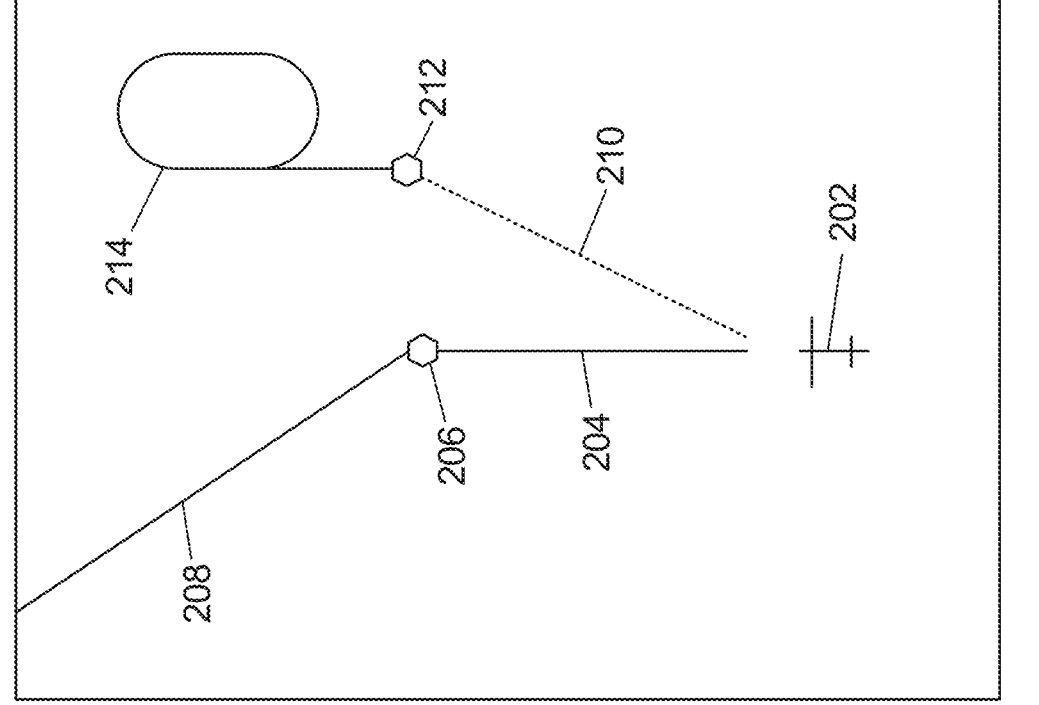
FIG. 2 is an example engine out flight display generated by the system for displaying the engine out flight plan via the aircraft display device.
Figure 2:
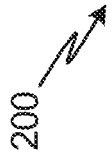

FIG. 2 depicts engine out flight display 200 generated by the system 100. Engine out flight display includes aircraft icon 202, primary flight path active leg 204, primary flight path waypoint 206, primary flight path inactive leg 208, engine out flight path first leg 210, engine out flight path waypoint 212, and engine out flight path second leg 214.

In the depiction of engine out flight display 200, the primary flight plan (i.e., the non-emergency flight plan) is active, and the secondary flight plan is the engine out flight plan which is displayed alongside the primary flight plan as the inactive flight plan. The primary flight plan can be generated by operation of a flight path computer configured to calculate the primary flight path. As depicted in engine out flight display 200, the primary flight path can be displayed upon display device 112.

Engine out flight display 200 is displayed, for example, upon execution of flight plan generation module 118 of system 100. In the depicted embodiment of engine out flight display 200, the engine out flight plan is displayed as the secondary flight plan. In some embodiments, execution of flight plan generation module 118 occurs before aircraft takeoff, and hence engine out flight display 200 is depicted for the pilot to see prior to takeoff.

During normal, non-emergency aircraft operation, the aircraft operator follows primary flight path active leg 204 to direct the aircraft, represented by aircraft icon 202, towards primary flight path waypoint 206. Flight path inactive leg

208 is representative of the flight path of the aircraft after reaching primary flight path waypoint 206.

Upon execution of flight plan display module 122 of system 100 in response to detection of an engine anomaly, engine out flight display 200 is updated. Engine out flight display 200 converts the engine out flight plan indicated by engine out flight path first leg 210, engine out flight path waypoint 212, and engine out flight path second leg 214, into the active flight plan. In some embodiments, primary flight path active leg 204, primary flight path waypoint 206, and primary flight path inactive leg 208 are removed. In other embodiments, the color scheme of the display is adjusted to indicate that the engine out flight plan is the active flight plan (i.e., the engine out flight plan is displayed in addition to the original primary flight plan). Thus, the aircraft operator becomes aware that the engine out flight plan is now the active flight plan, and the aircraft operator is able to determine the necessary flight path for the aircraft.

Engine out flight plan is displayed via display device 112 of system 100 as a primary flight plan after the engine anomaly is detected. Hence, the engine out flight plan includes an active flight path to engine out flight path waypoint 212 (i.e., engine out flight path first leg 210), and an inactive flight path depicting a flight path to be followed after the waypoint is reached (i.e., engine out flight path second leg 214).

Engine out flight display 200 provides several advantages. Engine out flight display 200 presents the engine out flight plan as a secondary flight plan thereby allowing the aircraft operator to have advanced notice as to the flight path in the case of an engine out condition. Further, engine out flight display 200 depicts the engine out flight plan as the active flight plan in response to an engine anomaly. Thus, the aircraft operator is able to visualize and follow the active flight plan without the potential of confusion by having another flight plan (e.g., the original primary flight plan) as the active flight plan. The depicted embodiment provides an advantage over prior art systems which may include manually inputting a waypoint and corresponding radius (e.g., via a dashed circular line) giving an imprecise and difficult to follow indication of how the aircraft operator should direct the aircraft in an engine out condition. In the present disclosure, engine out flight display provides a flight plan for the aircraft operator to follow, with little opportunity for confusion.

Figures 3A, 3B:
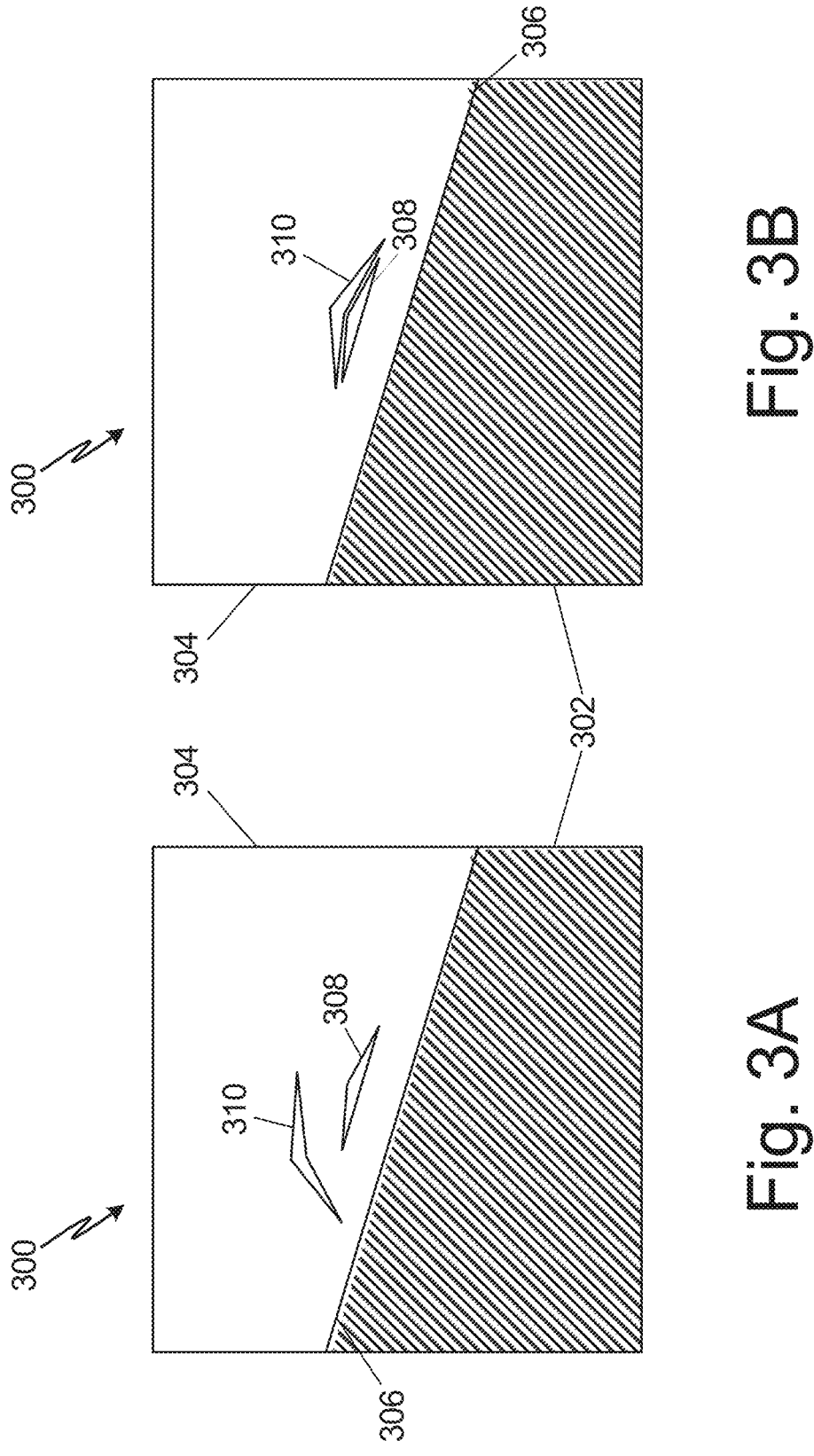
FIG. 3A is an example flight director display.
FIG. 3B is an example updated flight director display generated via the system for displaying the engine out procedure.

FIG. 3A is an example flight director display 300. FIG. 3B depicts flight director display 300 upon flight director display 300 being updated by system 100 in response to the detection of an engine anomaly. FIGS. 3A and 3B will be discussed concurrently. FIGS. 3A and 3B depict the embodiment of system 100 discussed above with respect to FIG. 1, wherein system 100 can automatically infer an engine anomaly has occurred based upon the course of the aircraft. Thus, system 100 can correspondingly display the engine out flight plan (as discussed in the description of FIG. 2) and update the flight director, as shown in FIGS. 3A and 3B.

Flight director display 300 includes ground 302, sky 304, horizon line 306, aircraft indicator 308, and flight director 310. Flight director 310 depicts a direction which a flight computer calculates as the direction in relation to horizon line 306 which the aircraft should fly in order for the aircraft to travel along the flight plan. Aircraft operators are regularly instructed to fly the aircraft such that aircraft indicator 308 is nestled within flight director 310. Further, in autopilot procedures, the aircraft computer ensures that aircraft indicator 308 is nestled within flight director 310 in order to maintain the flight path.

Flight director display 300 of FIG. 3A is indicative of a scenario in which an engine anomaly has occurred, however the aircraft computer has not yet detected the engine anomaly and is still following a primary flight plan (e.g., a flight plan indicative of the original course of the aircraft loaded prior to takeoff). The aircraft operator, however, has changed the course of the aircraft in response to the engine anomaly. Because the aircraft operator has reacted to an engine anomaly and changed the direction of flight of the aircraft without the aircraft computer having updated the primary flight plan to reflect the engine out flight plan, flight director 310 indicates a direction representative of the primary flight plan that is different from the actual direction of the path the aircraft operator is manually piloting the aircraft on, which is shown by aircraft indicator 308.

As discussed with respect to the description of FIG. 1, system 100 can automatically infer an engine anomaly has occurred based upon the course of the aircraft. System 100 can detect whether the aircraft is following the engine out flight plan. In the example of FIG. 3A, upon detecting that the aircraft is off-course from the primary flight plan and/or that the aircraft is substantially following the engine out flight plan, system 100 can thereafter automatically indicate that an engine anomaly is occurring. System 100 can then update flight director 310 such that flight director 310 is representative of the direction in relation to horizon line 306 which the aircraft should fly in order for the aircraft to fly along the engine out flight plan. Such a representation of the updated flight director 310 is depicted in FIG. 3B.

In some embodiments, system 100 updates flight director 310 upon detecting that the aircraft is off-course from the primary flight plan and/or that the aircraft is substantially following the engine out flight plan for a predetermined period of time (e.g., 10 seconds). In some embodiments, system 100 detects that the engine is substantially following the engine out flight plan by determining the bank angle of the aircraft. In some embodiments, a predetermined trigger point (e.g., 10 degrees of bank and 5 seconds off course) is used to determine whether aircraft indicator should be updated.

While the example of FIGS. 3A and 3B is intended to show the embodiment in which flight director 310 is updated in response to system 100 inferring that an engine anomaly has occurred, it is understood that updating flight director 310 to the depiction shown in FIG. 3B can also be done in the other anomaly detection embodiments listed with respect to system 100. For example, the depiction of flight director 310 in FIG. 3B can be generated in response to a manual user input indicating that an engine anomaly has occurred. In another example, the flight crew can manually override the current flight plan to the engine out flight plan. In another example, the depiction of flight director 310 in FIG. 3B can be generated in response to an engine anomaly being detected by emergency detection system 128 and transmitted to system 100 via communication device 108. Any such indication of an engine anomaly can result in flight director 310 being updated.

The techniques of updating flight director display 300 provide several benefits. Specifically, updating flight director display 300 allows for the aircraft operator to redirect the aircraft towards the engine out flight path in line with flight director 310. As described, aircraft operators are trained to pilot an aircraft such that the path of the aircraft substantially follows flight director 310. Thus, upon an emergency occurring and the aircraft operator having to direct the aircraft against flight director 310, the aircraft operator is required to actively go against the training protocol while trying to maintain course for the engine out flight plan. The techniques of updating flight director display 300, however, allow the aircraft operator to follow the training protocol while maintaining the course for the engine out flight plan.

FIG. 4 is a flowchart depicting method 400 for displaying the engine out procedure via the aircraft display device. The description of method 400 will make reference to the component numbers of system 100 (FIG. 1) for clarity.

Method 400 begins at step 402 wherein system 100 receives engine out procedure 102 via communication device 108. Engine out procedure 102 can be a textual description of the engine out flight plan and/or a graphical representation of the engine out flight plan. In some embodiments, a graphical user interface is displayed via display device 112 allowing a user to manually input engine out procedure 102. In such an embodiment, the user can enter a textual description of the engine out flight plan to be received by system 100. In other embodiments, engine out procedure 102 is electronically transmitted to system 100, without the need for manual input.

At step 404, processor 106 generates an engine out flight plan based upon the engine out procedure. Processor 106 generates the engine out flight plan based upon engine out procedure 102 by converting engine out procedure 102 into a flight plan format suitable for display via display device 112. Thus, processor 106 can convert the textual and/or graphical engine out procedure 102 into a flight plan for display via display device 112.

At step 406, system 100 receives an indication of an engine anomaly. In one embodiment, the engine anomaly is detected via emergency detection system 128. In another embodiment, the engine anomaly is detected via a manual input via a user interface within display device 112. In another embodiment, system 100 can automatically infer an engine anomaly has occurred based upon the aircraft being off-course and/or substantially following the engine out flight plan for a predetermined period of time.

At step 408, display device 112 displays the engine out flight plan in response to the indication of the engine anomaly. In one embodiment, display device 112 displays the engine out flight plan as the primary flight plan. In some embodiments, the engine out flight plan is previously displayed as the secondary flight plan and is then displayed as the primary flight plan, as depicted in FIG. 2.

At step 410, system 100 updates a guidance aid overlay (i.e., a flight director) to display a flight attitude based upon the engine out flight plan. In some embodiments, the flight director is updated on an attitude indicator that is distinct from display device 112. In other embodiments, the attitude indicator is integrated within display device 112. The flight director can be updated in accordance with the embodiments described with respect to FIGS. 3A and 3B.

The techniques of this disclosure allow for displaying an engine out procedure on a display device within an aircraft. The system operates by receiving the engine out procedure detailing the steps to be taken in the case of an engine out condition, generating an engine out flight plan based upon the engine out procedure, receiving an indication of an engine anomaly, displaying the engine out flight plan, and correspondingly updating the flight indicator. The system is particularly advantageous as it allows for an aircraft operator to visualize a path for the aircraft in the case of an engine anomaly, as opposed to having to manually pilot the aircraft in accordance with the engine out procedure. Further, the pilot is able to follow the flight indicator in accordance with pilot training. The techniques of this disclosure allow for less risk of safety critical issues during an engine out landing.

Discussion of Possible Embodiments

The following are non-exclusive descriptions of possible embodiments of the present invention.

A system for displaying an engine out flight plan via an aircraft display device includes a processor and computer-readable memory operably connected to the processor. The computer-readable memory is encoded with instructions that, when executed by the processor, cause the system to perform the following steps. The system receives an engine out procedure. The system generates the engine out flight plan based upon the engine out procedure. The system displays the engine out flight plan via the aircraft display device. The system receives an indication of an engine anomaly. The system updates a guidance aid overlay on the aircraft display device to display a flight attitude based upon the engine out flight plan in response to the indication of the engine anomaly via the aircraft display device.

The system of the preceding paragraph can optionally include, additionally and/or alternatively, any one or more of the following features, configurations and/or additional components:

A further embodiment of the foregoing system, wherein the computer-readable memory is further encoded with instructions that, when executed by the processor, cause the system to receive the indication of the engine anomaly from an aircraft emergency detection system.

A further embodiment of the foregoing system, wherein the computer-readable memory is further encoded with instructions that, when executed by the processor, cause the system to detect whether an aircraft flight path is following the engine out flight plan, and indicate the engine anomaly based upon the aircraft flight path following the engine out flight plan for a predetermined period of time.

A further embodiment of the foregoing system, wherein the computer-readable memory is further encoded with instructions that, when executed by the processor, cause the system to detect whether an aircraft flight path is off course from a primary flight plan, detect whether the aircraft flight path is substantially following the engine out flight plan, and indicate the engine anomaly in response to the aircraft flight path substantially following the engine out flight plan.

A further embodiment of the foregoing system, wherein the computer-readable memory is further encoded with instructions that, when executed by the processor, cause the system to receive an indication via a user input indicating that the engine anomaly has occurred.

A further embodiment of the foregoing system, wherein the engine out flight plan is displayed as a secondary flight plan prior to the engine anomaly being detected.

A further embodiment of the foregoing system, wherein the engine out flight plan is displayed as a primary flight plan after the engine anomaly is detected.

A further embodiment of the foregoing system, wherein the engine out flight plan includes an active flight path to a waypoint, and an inactive flight path depicting a flight path to be followed after the waypoint is reached.

A further embodiment of the foregoing system, wherein the engine out procedure is a textual description of the engine out flight plan.

A further embodiment of the foregoing system, wherein generating the engine out flight plan based upon the engine out procedure includes converting the textual description of the engine out flight plan to a flight plan format suitable for display on the aircraft display device.

A further embodiment of the foregoing system, wherein the engine out procedure is a graphical representation of the engine out flight plan.

A further embodiment of the foregoing system, wherein generating the engine out flight plan based upon the engine out procedure includes converting the graphical representation. of the engine out flight plan to a flight plan format suitable for display on the aircraft display device A further embodiment of the foregoing system, a flight path computer configured to calculate a primary flight path, wherein the primary flight path is displayed upon the aircraft display device; and the engine out flight plan is displayed on the aircraft display device in addition to or in place of the primary flight plan.

A method for displaying an engine out flight plan via an aircraft display device includes receiving an engine out procedure. The method further includes generating, via a processor, an engine out flight plan based upon the engine out procedure. The method further includes receiving an indication of an engine anomaly. The method further includes displaying, via an aircraft display device, the engine out flight plan in response to the indication of the engine anomaly. The method further includes updating a guidance aid overlay on the aircraft display device to display a flight attitude based upon the engine out flight plan.

A further embodiment of the foregoing method, further comprising updating a guidance aid overlay on the aircraft display device to display a flight attitude based upon the engine out flight plan.

A further embodiment of any of the foregoing methods, further comprising receiving the indication of the engine anomaly from an aircraft emergency detection system.

A further embodiment of any of the foregoing methods, further comprising detecting whether an aircraft flight path is following the engine out flight plan, and indicating the engine anomaly based upon the aircraft flight path following the engine out flight plan for a predetermined period of time.

A further embodiment of any of the foregoing methods, further comprising detecting whether an aircraft flight path is off course from a primary flight plan, detecting whether the aircraft flight path is substantially following the engine out flight plan, and indicating the engine anomaly in response to the aircraft flight path substantially following the engine out flight plan.

A further embodiment of any of the foregoing methods, further comprising calculating, via a flight path computer, a primary flight plan; displaying the primary flight plan on the aircraft display device; and displaying, via the aircraft display device, the engine out flight plan in addition to or in place of the primary flight plan, in response to the indication of the engine anomaly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for displaying an engine out flight plan via an aircraft display device, the system comprising:

a processor; and computer-readable memory operably connected to the processor, the computer-readable memory encoded with instructions that, when executed by the processor, cause the system to:

receive an engine out procedure;

generate the engine out flight plan based upon the engine out procedure;

display the engine out flight plan via the aircraft display device;

receive an indication of an engine anomaly;

update a guidance aid overlay on the aircraft display device to display a flight attitude based upon the engine out flight plan in response to the indication of the engine anomaly via the aircraft display device;

detect whether an aircraft flight path is following the engine out flight plan; and indicate the engine anomaly based upon the aircraft flight path following the engine out flight plan for a predetermined period of time.

2. The system of claim 1, wherein the computer-readable memory is further encoded with instructions that, when executed by the processor, cause the system to:

detect whether an aircraft flight path is off course from a primary flight plan;

detect whether the aircraft flight path is following the engine out flight plan; and indicate the engine anomaly in response to the aircraft flight path following the engine out flight plan.

3. The system of claim 1, wherein the computer-readable memory is further encoded with instructions that, when executed by the processor, cause the system to:

receive an indication via a user input indicating that the engine anomaly has occurred.

4. The system of claim 1, wherein the engine out flight plan is displayed as a secondary flight plan prior to the indication of engine anomaly being received.

5. The system of claim 4, wherein the engine out flight plan is displayed as a primary flight plan after the indication of engine anomaly is received.

6. The system of claim 1, wherein the engine out flight plan includes an active flight path to a waypoint, and an inactive flight path depicting a flight path to be followed after the waypoint is reached.

7. The system of claim 1, wherein the engine out procedure is a textual description of the engine out flight plan.

8. The system of claim 7, wherein the instructions that cause the system to generate the engine out flight plan based upon the engine out procedure include converting the textual description of the engine out flight plan to a flight plan format suitable for display on the aircraft display device.

9. The system of claim 1, wherein the engine out procedure is a graphical representation of the engine out flight plan.

10. The system of claim 9, wherein the instructions that cause the system to generate the engine out flight plan based upon the engine out procedure include converting the graphical representation of the engine out flight plan to a flight plan format suitable for display on the aircraft display device.

11. The system of claim 1, further comprising:

a flight path computer configured to calculate a primary flight path, wherein:

the primary flight path is displayed upon the aircraft display device; and the engine out flight plan is displayed on the aircraft display device in addition to or in place of the primary flight plan.

12. A method for displaying an engine out flight plan via an aircraft display device, the method comprising:

receiving an engine out procedure;

generating, via a processor, the engine out flight plan based upon the engine out procedure;

receiving an indication of an engine anomaly;

displaying, via the aircraft display device, the engine out flight plan in response to the indication of the engine anomaly;

updating a guidance aid overlay on the aircraft display device to display a flight attitude based upon the engine out flight plan;

detecting whether an aircraft flight path is following the engine out flight plan; and indicating the engine anomaly based upon the aircraft flight path following the engine out flight plan for a predetermined period of time.

13. The method of claim 12, further comprising:

detecting whether an aircraft flight path is off course from a primary flight plan;

detecting whether the aircraft flight path is following the engine out flight plan; and indicating the engine anomaly in response to the aircraft flight path following the engine out flight plan.

14. The method of claim 12, further comprising receiving an indication via a user input indicating that the engine anomaly has occurred.

15. The method of claim 12, wherein the engine out flight plan is displayed as a secondary flight plan prior to the engine anomaly indication being received.

16. The method of claim 12, further comprising:

calculating, via a flight path computer, a primary flight plan;

displaying the primary flight plan on the aircraft display device; and displaying, via the aircraft display device, the engine out flight plan in addition to or in place of the primary flight plan, in response to the indication of the engine anomaly.

* * * * *